US011656117B1

(12) United States Patent
Bequette et al.

(10) Patent No.: US 11,656,117 B1
(45) Date of Patent: May 23, 2023

(54) TEST SYSTEM FOR ROTARY AIRLOCKS

(71) Applicant: Mississippi Lime Company, St. Louis, MO (US)

(72) Inventors: Gerald K. Bequette, Ste. Genevieve, MO (US); Nathan T. Hooper, Farmington, MO (US); Randy Griffard, St. Mary, MO (US); Martin Gran, Chesterfield, MO (US)

(73) Assignee: Mississippi Lime Company, St. Louis, MO (US)

( * ) Notice: Subject to any disclaimer, the term of this patent is extended or adjusted under 35 U.S.C. 154(b) by 302 days.

(21) Appl. No.: 16/874,462

(22) Filed: May 14, 2020

Related U.S. Application Data

(60) Provisional application No. 62/847,667, filed on May 14, 2019.

(51) Int. Cl.
G01M 3/26 (2006.01)
G01F 25/00 (2022.01)
G01F 15/00 (2006.01)
B65G 53/04 (2006.01)
G01F 11/26 (2006.01)

(52) U.S. Cl.
CPC ......... *G01F 25/0092* (2013.01); *B65G 53/04* (2013.01); *G01F 11/261* (2013.01); *G01F 15/005* (2013.01); *G01M 3/26* (2013.01)

(58) Field of Classification Search
CPC .. G01F 25/0092; G01F 15/005; G01F 11/261; B65G 53/04; G01M 3/26

USPC ... 73/40, 40.5 R, 40.7, 46, 49.8, 168, 865.9; 417/63; 416/61
See application file for complete search history.

(56) References Cited

U.S. PATENT DOCUMENTS 8,747,029 B2 * 6/2014 Thorn .................... B65G 53/66
406/197

FOREIGN PATENT DOCUMENTS

JP        2945936      *  9/1999

OTHER PUBLICATIONS

Mace, Bob, "Everything You Need to Know About Airlock Valves", Industrial Accessories Company, 15 Pages, Mission, KS.
"Why Airlocks Leak and How to Minimize Leakage", ACS Valves, Mar. 26, 2015, https://www.acsvalves.com/rotary-valve-blog/read/title/why-airlocks-leak-and-how-to-minimize-leakage.
"How to Troubleshoot Pneumatic Conveying Systems", Magnum Systems, Feb. 2018, https://www.magnumsystems.com/2018/02/troubleshoot-pneumatic/.
Wypych, Peter W. et al., "Theoretical Modelling of Rotary Valve Air Leakage for Pneumatic Conveying Systems" 2002, 1-13, https://ro.uow.edu.au/engpapers/1287.

* cited by examiner

*Primary Examiner* — Robert R Raevis
(74) *Attorney, Agent, or Firm* — Lewis Rice LLC

(57) ABSTRACT

A rotary airlock test and demonstration setup, system, and method allowing for rotary airlocks to be tested for air leakage, wear, and particularly for inconsistent wear. The system allows for testing of the rotary airlocks on site utilizing a truck mounted system and even in situ should a portion of the air path for the testing be part of the pneumatic conveyor the rotary airlock would be used with.

20 Claims, 10 Drawing Sheets

TEST SYSTEM FOR ROTARY AIRLOCKS

CROSS-REFERENCE TO RELATED APPLICATIONS

This application claims the benefit of U.S. Provisional Patent Application No. 62/847,667, filed May 14, 2019, The entire disclosure of which is herein incorporated by reference.

BACKGROUND OF THE INVENTION

Field of the Invention

The invention relates generally to systems and methods for the testing of rotary airlocks and similar devices to quantify air leakage through them particularly due to wear.

Description of the Related Art

Particle flow, which is the movement of particulate materials, can be surprisingly complicated. Particulates, which are materials formed of large numbers of small solid particles, tend to behave in their movement more akin to liquids. For example, particulates will generally "flow" under the influence of gravity. At the same time, particulates are made up of a collection of solid particles or granules with a generally non-trivial size and mass. As such, many traditional movement methods designed for liquids simply do not work on them since the particles are distinguishable.

Particulate compositions in the form of bulk dry solids can comprise huge numbers of items of a variety of different sizes and particulate compositions and are used in a huge number of industries including agriculture, material production, and minerals. Essentially, there is a constant need to be able to move around compositions in the form of particulates and particulate flows. In order to transport particulates, one of the most common methodologies is to use a positive pressure pneumatic conveying system. This works across a large number of industries and materials and essentially involves the particulate being dispersed into a stream of air that is being forced through the distribution apparatus. The particulate become airborne and the individual particles (which are usually individually quite light) are carried by the moving air to a destination, where the air movement is stopped and the particles drop out of the air due to gravity.

In order to get the particulates into the airstream in the first place, a rotary airlock is commonly used. Also called a rotary feeder or rotary valve, a rotary airlock is designed to provide two separate benefits in conjunction with managing particle conveying. The first is to feed the particulate stream into the pneumatic conveyor airstream in a controlled fashion and the second is to inhibit the positive pressure air in the conveyor from travelling through the rotary airlock and into the storage area (which is often a gravity fed silo).

The rotary airlock is not a particularly complicated mechanical device. It essentially comprises a center axle with a number of fins or vanes attached thereto. This is commonly on the order of 6 to 10 vanes on a single axle with the number selected based on characteristics of the particle flow through the airlock and concerns of air leakage. The vanes or fins will extend along the length of the center axle usually with their major dimension parallel to the axis of the center axle. The vanes may be capped on opposing ends by a shroud plate which forms what is commonly called a "closed end rotor" or may be open creating what is commonly called an "open end rotor."

The rotor is placed into a housing having a generally cylindrical inner volume with two opposing openings in the side which size corresponds to the size of the rotor. The shroud plate or open ends of the vanes will typically be adjacent the ends of the interior volume of the housing. As the rotor turns, the vanes and/or shroud plate brush against (or simply pass very close to) the interior surfaces. This motion means the spaces between adjacent vanes are sequentially presented to one and then the other opening. At the opening adjacent the storage area, the particulate is fed into the space between vanes while at the other the particulate between the vanes is "poured" into the pneumatic conveyor's airstream. Most of us are familiar with this general type of structure as it is loosely the structure of a revolving door if one was to treat the humans flowing in it as particularly large particles that together form a particulate flow.

As opposed to a revolving door where the axle is mounted generally vertically however, a rotary airlock will typically be mounted with the axle horizontal so as to utilize gravity to move the particles through the rotor, although this is by no means required. This position allows a rotary airlock to be mounted under a gravity feed silo including the particulate to be transported and above the pneumatic conveyor with the axle generally perpendicular to the flow of the airstream in the conveyor. The openings in the sides of the housing will be positioned so that one opens to the silo while the other opens to the airstream.

The rotor will generally rotate in the direction opposed to the direction that the airstream would push it in so that as the rotor turns, the particulate in the silo will fall into an open first chamber between two adjacent vanes and that chamber will rotate toward the downstream side of the airlock. Upon the chamber reaching the second opening, the particulate in the chamber will be poured into the airstream (that is not all at once but in a stream) and will be carried downstream by the pneumatic conveyor. This chamber will then turn toward the downstream side of the airlock where it will eventually clear the opening and have air in the chamber (which may be slightly pressurized). Eventually, the chamber will complete a full rotation releasing any air into the silo as it is displaced by the next round of falling particulate.

It should be recognized that while a rotary airlock is a relatively simple mechanical device, it must be capable of moving various granular materials when there is an air pressure or vacuum on either opening. Further an improperly selected airlock or one which is no longer functioning within expected parameters can lead to efficiency problems and materials not being dispensed and thus conveyed in the expected fashion.

Part of the operation of the rotary airlock is to keep the air pressure in the pneumatic conveyor from pushing past the rotary airlock and into the silo generally on the upstream side of the airlock. While it is impossible to prevent all leakage, by positioning the airlock as discussed above and having it rotate in the direction opposed to how the airstream would push it, the airlock effectively creates two paths between the conveyor and the silo.

The airlock also attempts to inhibit airflow from the pneumatic conveyor disturbing the flow of particulate by having the vanes in the rotor positioned in very close proximity and effectively "brushing" the inner housing to inhibit air from flowing through the airlock and into the silo. This provides for a very small area for the air to push through between the vane and housing. As the pneumatic conveyor often does not use substantial flow for small particulates, it does not generate too much pressure in most cases. Thus, generally only relatively small amounts of air will push past the vanes and into the silo.

While rotary airlocks are common for feeding dry bulk materials into a pneumatic conveying system, the term "airlock" is not really accurate as air leakage past the rotary airlock into the silo (which is also called blow-by) is effectively inherent to the airlock's design, and the airlock will leak air at a rate proportional to the pressure differential across the airlock. The pressure below the airlock is created by resistance to flow as material is transferred and rotary airlocks are designed to keep a fairly consistent pressure differential so material can travel efficiently through the pneumatic system. Thus, the loss of some air is expected and so long as that amount is known and relatively constant, the system can effectively be designed to take it into account.

Concerns primarily arise from alterations or changes in loss of air pressure (as well as if the absolute loss gets too high) and are numerous. In the first instance, sufficient air pressure passing into the silo can result in the particulate in the silo becoming airborne directly above the airlock pushing it away from the airlock. This can result in a decreased flow of particulate through the airlock as well as undesired movement of the particulate within the silo. In an extreme case, loss of air pressure through the airlock into the silo can result in sufficient loss of pressure within the conveyor that the particulate is no longer being correctly conveyed and the conveyor ceases to function.

While the blow-by of a newly installed rotary airlock is generally relatively easy to determine, once an airlock is in use the amount can change and this can alter, possibly quite dramatically, the dynamics and transport capabilities of the pneumatic conveyor. This can be a major problem where the silo is not only serving to store the particulate and the conveyor is being used to move it to a different location, but where the combination is being used to more precisely meter the flow through the conveying system for some other purpose.

One such example where the pneumatic conveyor effectively acts as a metering system is if the particulate stream in the conveyor is used in a manufacturing process where the particulate will be mixed with another material, particularly another air transported particulate, and the resultant stream needs to have relatively constant flows of the two streams to ensure that the relative percentage of each component remains essentially the same over time. This could be, for example, to form a resultant compound where the relative percentages are of generally specific ratio and can be the case in things such as drug tablet manufacture. In this scenario, if one stream has a greater loss of pressure due to wear than is expected or compensated for, the amount of particulate coming in that stream may be unintentionally (and unknowingly) reduced (often by an unknown and even inconsistent amount) as vortex effects or internal movement within the silo disrupt the steady state flow.

Another area where this can be problematic is the use of particulate in conjunction with pollution control and particularly for pollution control utilizing in-flight neutralization. Many efforts have been made to develop materials for improved capability for cleaning or "scrubbing" flue gas or combustion exhaust. Most of the interest in such scrubbing of flue gas is to eliminate particular compositions, specifically acid gases, that contribute to particularly detrimental known environmental effects, such as acid rain.

Flue gases are generally very complex chemical mixtures which comprise a number of different compositions in different percentages depending on the material being combusted, the type of combustion being performed, impurities present in the combustion process, and specifics of the flue design. However, the release of certain chemicals into the atmosphere which commonly appear in flue gases is undesirable, and therefore the release of those specific components is generally regulated by governments and controlled by those who perform the combustion.

Some of the chemicals that are subject to regulation are certain acid gases. A large number of acid gases are desired to be, and are, under controlled emission standards in the United States and other countries. This includes compounds such as, but not limited to, hydrogen chloride (HCl), sulfur dioxide ($SO_2$), and sulfur trioxide ($SO_3$). Sulfur trioxide can evidence itself as condensable particulate in the form of sulfuric acid ($H_2SO_4$). Condensable particulate can also be a regulated emission.

Flue gas exhaust mitigation is generally performed by devices called "scrubbers". Scrubbers introduce chemical compounds into the flue gas. The compounds then react with the undesirable compounds which are intended to be removed. Through these reactions, the undesirable compounds are either captured and disposed of, or turned into a less harmful compound prior to their exhaust, or both. In addition to controlling the emissions for environmental reasons, it is desirable for many combustion plant operators to remove acid gases from the plant's flue gas to prevent the acid gases from forming powerful corroding compounds which can damage flues and other equipment.

Scrubbers can come in a few different varieties. In their simplest form, they are provided as beds or pads where the flue gas may pass over the bed to create the desired reaction. While simple, these structures have a problem that they can only react with components in the flue gas that are in the particular portion of the stream that happens to be in contact with the bed. As such, they are only really useful if the target material to be removed is at a known location within the flue stream and are rarely used.

In an alternative situation, the scrubber material can be placed on a filter or similar structure which the flue gas flows through. As opposed to static structures on the side of the flow, these structures have the advantage that the entirety of the flue gas generally is manipulated into close proximity with the material of a scrubber. In effect, it gives the scrubber greater surface area contact with the flue gas which can result in vastly more contact between the target molecules and the molecules of the scrubber. Their problem, however, is that having to flow the gas through these structures often creates substantial back pressure which increases the more surface area provided as part of the filter and the more effective the filtration.

Because of the above problems, one of the best ways to provide for scrubbing is to utilize airborne particles of the scrubber which are injected into the flue gas to provide in-flight neutralization. A common method of introduction of the sorbents into the gas stream is to use Dry Sorbent Injections (DSI). The sorbents are prepared as a fine or coarse powder and transported and stored at the use site. DSI systems pneumatically convey powdered sorbents to form a fine powder dispersion in the duct. Due to inherent air movement within the flue gas stream, these particles remain airborne and move around within the stream. This can provide a substantial amount of interaction and the surface area contact can be dramatically increased. This increase also comes without concern of back pressure increases as is the case with filtration.

The problem with in-flight use is that the injection of the particulate into the flue gas is similar to the merging of two particulate streams. However, the flue gas comprises a stream of unknown and generally changing specific composition with a relatively chaotic flow. Thus, the flow of scrubbing agent from the injector is particularly important to be regular and controlled to ensure that sufficient amounts are injected to deal with the flue gas at all times. Further, as the scrubber material is often expensive both in actual cost and in the cost to later remove it from the stream, utilizing a large excess is generally also undesired.

Much of the efficiency of DSI equipment is therefore dictated by the ability of the injection system to have the sorbent contact the acidic components of the flue gas. Flue gas pathways are not homogeneous in nature, as structural components of the flue, wall effects, and combustion processes provide a flue gas stream that can be stratified horizontally or vertically. It is the job of the DSI system to put the sorbent where the acid gas travels. Sorbent which does not enter the zones where acid is concentrated is free to react with other components of the flue gas or remain unreacted until removed in particulate collection.

Because efficiency of DSI systems are so dependent on sorbent contact in the resulting flow, it should be apparent that alterations in sorbent flow from a storage location (e.g. a silo) to the DSI equipment can create problems. As DSI equipment is commonly fed using a pneumatic conveyor from a silo which is regulated by a rotary airlock. knowing if rotary airlocks require service due to potential alteration in the air stream altering function can be critical. Different sorbet materials (or even different brands of the same type of material) can also cause different types and levels of damage to rotary airlocks based on their particle sizes and composition. Being able to determine the actual damage caused to a system by different materials can be valuable as it can allow better decision making in selecting sorbent products as induced wear can be taken into account. It can also allow for more robust maintenance procedures to be implemented based on the selected material.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of the problems inherent in understanding if a rotary airlock is functioning correctly, if a rotary airlock has worn and requires service or replacement, and in determining even which type of rotary airlock is most suitable for a particular situation, described herein, among other things are a rotary airlock test and demonstration setup, system, and method allowing for rotary airlocks to be tested for air leakage, wear, and particularly for inconsistent wear. The system allows for testing of the rotary airlocks on site utilizing a truck mounted system and even in situ should a portion of the air path for the testing be part of the pneumatic conveyor the rotary airlock would be used with.

Described herein, among other things, is a rotary airlock test system comprising: a pneumatic blower which provides air flow into a source air path, said source air path splitting into a first air path and a second air path; a plurality of flow sensors; a first rotary airlock placed as if it feeds particulate into said first air path via an outlet; a second rotary airlock placed as if it feeds particulate into said second air path via an outlet; a first plate sealing an inlet of said first rotary airlock; a second plate sealing an inlet of said second rotary airlock; and a control system for obtaining outputs from the plurality of flow sensors; wherein, at least one of said flow sensors from said plurality is placed in said source air path; wherein, at least one of said flow sensors from said plurality is placed in said first air path after said first rotary airlock; and wherein, at least one of said flow sensors from said plurality is placed in said second air path after said second rotary airlock.

In an embodiment of the system, the first rotary airlock is to be tested and said second rotary airlock is a control.

In an embodiment of the system, the first air path includes at least a portion of a pneumatic conveyor that said first rotary airlock feeds.

In an embodiment of the system, the second air path is designed to simulate conditions in said first air path.

In an embodiment of the system, the control system compares output from said at least one of said flow sensors placed in said first air path to output from said at least one of said flow sensors from said plurality placed in said second air path.

In an embodiment, the system further comprises at least one of said flow sensors from said plurality being placed on said first plate to monitor flow into said inlet through said first rotary airlock; and at least one of said flow sensors from said plurality being placed on said second plate to monitor flow into said inlet through said second rotary airlock.

In an embodiment of the system, the control system compares output from said at least one of said flow sensors placed on said first plate to output from said at least one of said flow sensors placed on said second plate.

In an embodiment, the system further comprises a valve positioned in said second air flow path prior to said second rotary airlock for inhibiting air from said source air path from entering said second air flow path.

In an embodiment, the system further comprises a valve positioned in said first air flow path after said first rotary airlock for creating back pressure in said first air flow path; and a valve positioned in said second air flow path after said second rotary airlock for creating back pressure in said second air flow path.

In an embodiment of the system, the flow sensors in said plurality of flow sensors comprise standard cubic feet per minute (SCFM) flow sensors.

In an embodiment, the system further comprises at least one of said flow sensors from said plurality being placed on said first plate to monitor flow into said inlet through said first rotary airlock; at least one of said flow sensors from said plurality being placed on said second plate to monitor flow into said inlet through said second rotary airlock; a valve positioned in said second air flow path prior to said second rotary airlock for inhibiting air from said source air path from entering said second air flow path; a valve positioned in said first air flow path after said first rotary airlock for creating back pressure in said first air flow path; and a valve positioned in said second air flow path after said second rotary airlock for creating back pressure in said second air flow path.

There is also described herein, in an embodiment, a method for testing a rotary airlock, the method comprising: providing a pneumatic blower which provides air flow into a source air path, said source air path splitting into a first air path and a second air path and a plurality of flow sensors; placing a first rotary airlock as if it feeds particulate into said first air path via an outlet; placing a second rotary airlock as if it feeds particulate into said second air path via an outlet; sealing an inlet of said first rotary airlock with a first plate; and sealing an inlet of said second rotary airlock with a second plate; positioning at least one of said flow sensors from said plurality is placed in said source air path; positioning at least one of said flow sensors from said plurality in said first air path after said first rotary airlock; and positioning at least one of said flow sensors from said plurality in said second air path after said second rotary airlock.

In an embodiment of the method, the first rotary airlock is to be tested and said second rotary airlock is a control.

In an embodiment of the method, the first air path includes at least a portion of a pneumatic conveyor that said first rotary airlock feeds.

In an embodiment, the method further comprises comparing output from said at least one of said flow sensors placed in said first air path to output from said at least one of said flow sensors from said plurality placed in said second air path.

In an embodiment, the method further comprises placing at least one of said flow sensors from said plurality on said first plate to monitor flow into said inlet through said first rotary airlock; and placing at least one of said flow sensors from said plurality on said second plate to monitor flow into said inlet through said second rotary airlock.

In an embodiment, the method further comprises comparing output from said at least one of said flow sensors placed on said first plate to output from said at least one of said flow sensors placed on said second plate.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

When a rotary airlock is built to specific tolerances to control air leakage, the airlock performance is at its optimum level of performance and the specific performance is also well known. When the airlock starts to wear, the designed and known rotor-to-housing tolerances are constantly increasing and altering, often in an inconsistent fashion. When the airlock rotor and housing wear, air leakage is increased and the airlock's ability to convey product is significantly reduced.

It should be recognized that rotary airlocks are a very high precision device which is put into an incredibly rough environment. With every rotation, the vanes are being purposefully forced to push and contact what is generally an abrasive material. Specifically when scrubbing materials such as calcium hydroxide are used, you are operating two close fitting metal components in a storm of rocklike material. Depending on the manufacture of the rotary airlock, there is always some tolerance for wear (and manufacturing irregularity). However, rotary valves not operating at high temperatures are typically set up with a tolerance factor of 0.004-0.006 inches and a valve can considered "worn-out" (requiring replacement) when tolerance between housing and rotor reaches 0.015 inches which is a very hard to detect change without the use of precision instruments.

Another problem with wear in rotary valves is that it occurs slowly, unevenly, and is all internal which makes it difficult to detect. There is no device on the market which is currently capable of directly detecting or predicting wear in situ with a rotary airlock between a feed silo and a pneumatic conveyor. Provided herein is a mobile testing and demonstration apparatus which can be used to detect and determine the actual wear to rotary airlocks by placing them in a highly controlled environment where changes in air at a variety of locations can be directly detected.

Figure 1:
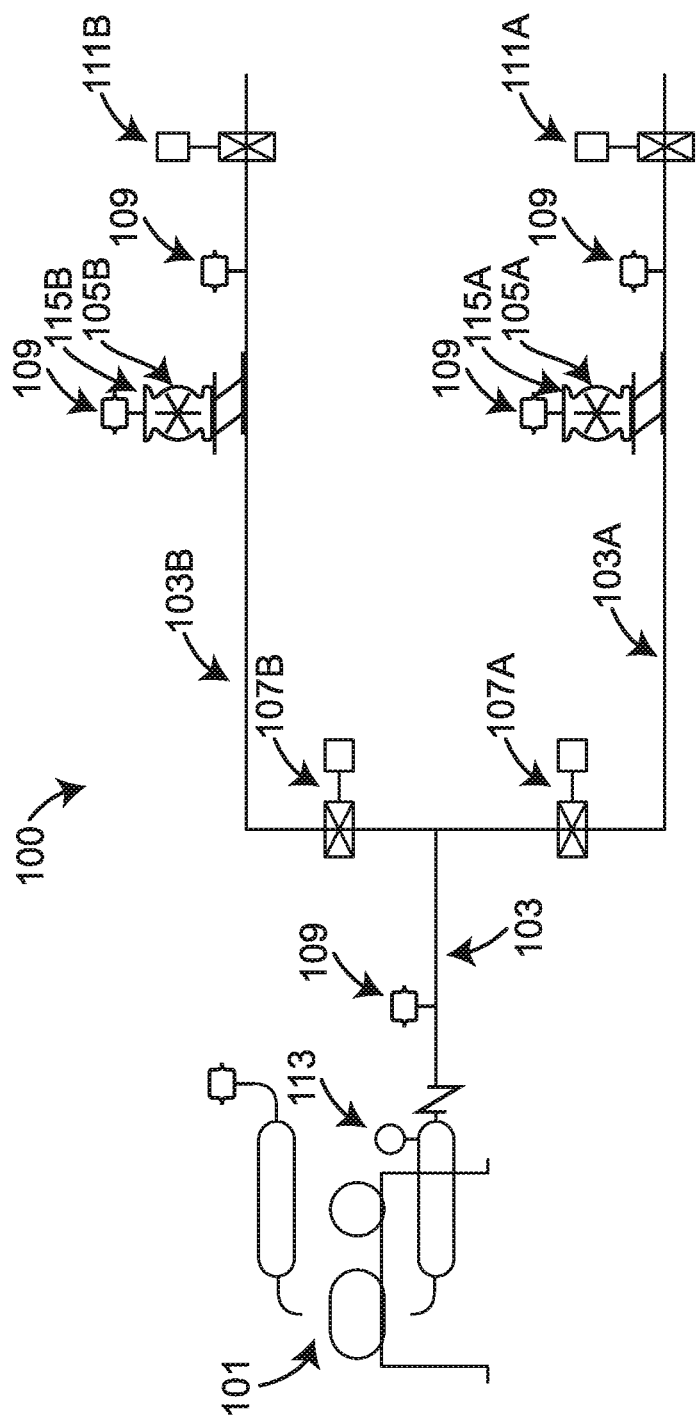
FIG. 1 provides a conceptual block diagram of an embodiment of a test rig for testing rotary airlocks.

FIG. 1 provides for a general block diagram of an embodiment of such a system (100). In most cases, the system (100) depicted in FIG. 1 can be built within a trailer such as a standard truck cargo trailer where it can be taken to a test site to quantify and compare the specific air leakage of individual rotary airlocks on site. This can help to detect when airlocks have worn, how they have worn, and can also educate on the importance of rebuilding and or changing the rotary airlock for powder and bulk solids handling applications on a routine timeline As shown in FIG. 1, an embodiment of the test and demonstration system (100) will generally comprise an assembly of a pneumatic blower (101) which is designed to feed air into at least one test flow path (103). The pneumatic blower (101) will typically be provided with a pressure gauge (113) to determine starting input pressure and to calibrate the test system with a desired pneumatic flow rate.

In the embodiment of FIG. 1, the test flow path (103) is split or forks prior to the rotary airlocks (105A) and (105B) into two paths (103A) and (103B). The rotary airlocks (105A) and (105B) are designed to be switched out to test different rotary airlocks as needed and each of the airlocks (105A) and (105B) will generally comprise either a rotary airlock removed from its current installation, or may comprise a comparison, demonstration, or "calibration" airlock which may be one that is new or has specific wear characteristics which are known. In an embodiment, one of the airlocks (105A) may comprise a unit to be tested and removed from a current installation while the other airlock (105B) comprises a comparable unit which is new. Typically the two paths (103A) and (103B) will each be connected via a valve (107A) or (107B) which allows for the air from the blower (101) to be electively sent down either or both of paths (103A) and (103B).

So as to test an airlock (105A) in a relatively simple fashion, the air path (103A) may be formed so that it includes at least a portion of the actual pneumatic conveyor which passes under the airlock (105A) in situ. That is the air path (103A) may be generated by connecting an output from the test system (100) to the input of the pneumatic conveyor in place of the blower that would normally power the conveyor. The other path (103B) may then be altered using add-in tubing, specific valve arrangements, or other systems or methods to replicate conditions in this in situ path such as length and back pressure. Alternatively, the airlock (105A) may be removed form the system and be tested ex situ simply by being "dropped-in" to the air path (103A) which is self-contained and independent from the conveyor.

Figure 2:
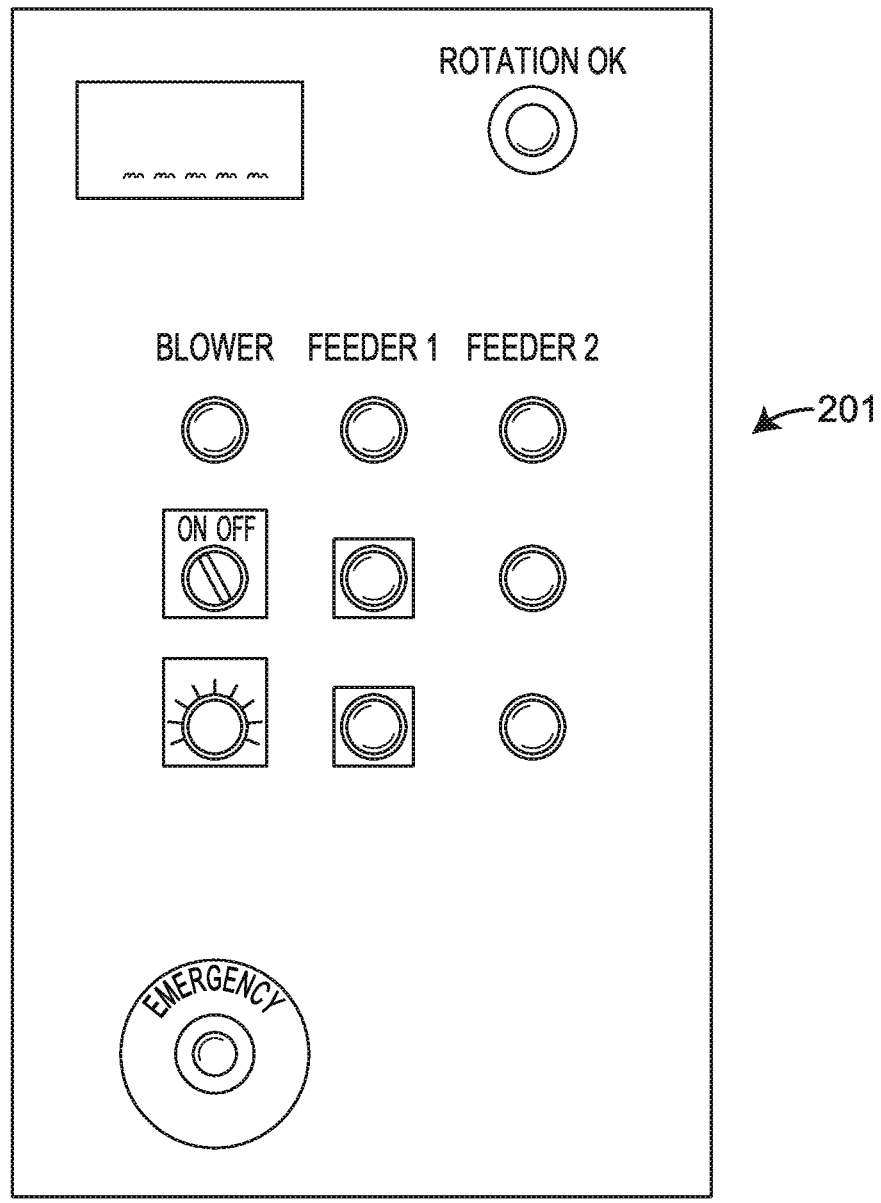
FIG. 2 depicts a control panel for a test rig for testing rotary airlocks.
Figure 3:
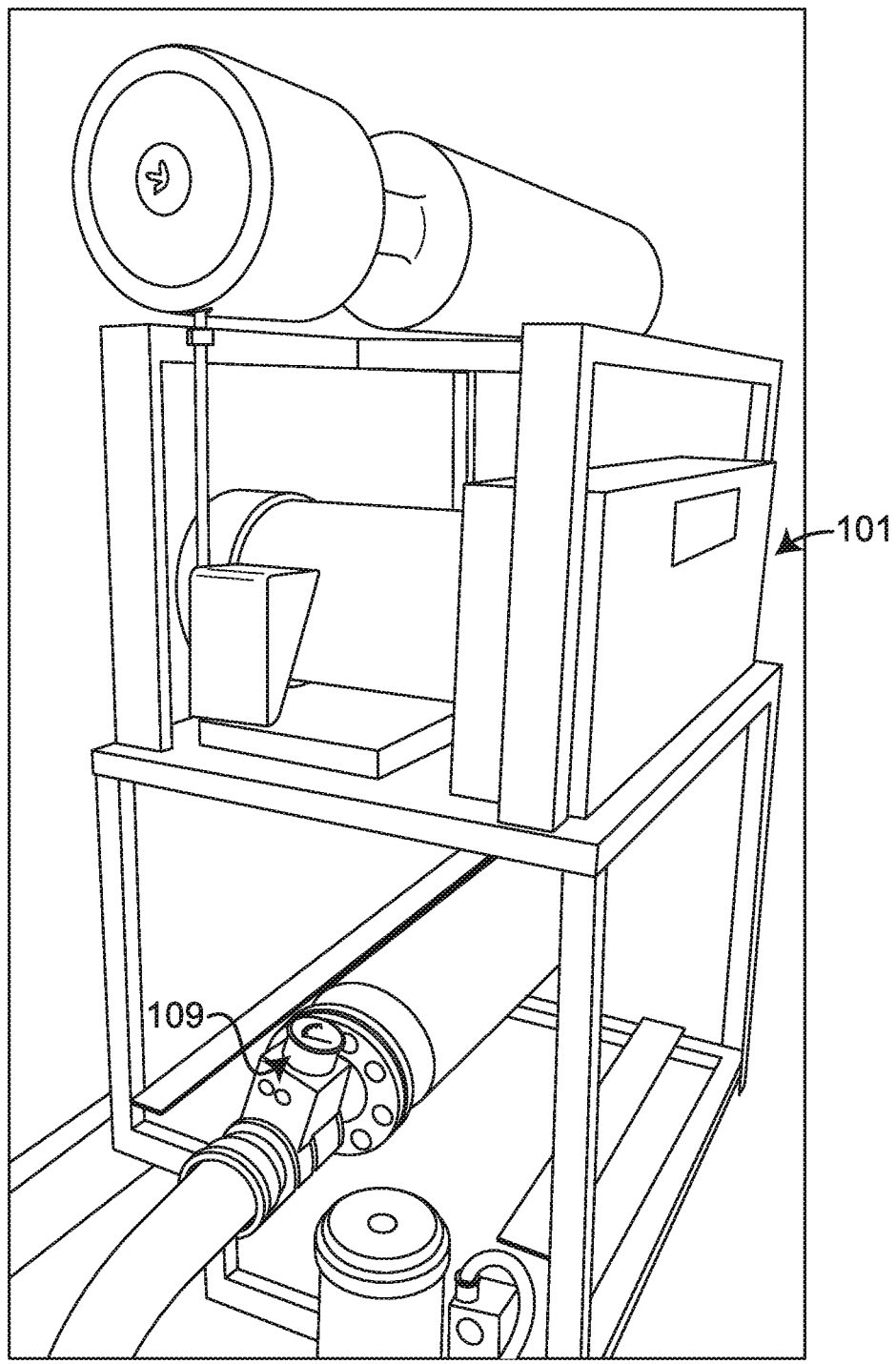
FIG. 3 depicts a pneumatic blower for a test rig for testing rotary airlocks.
Figure 4:
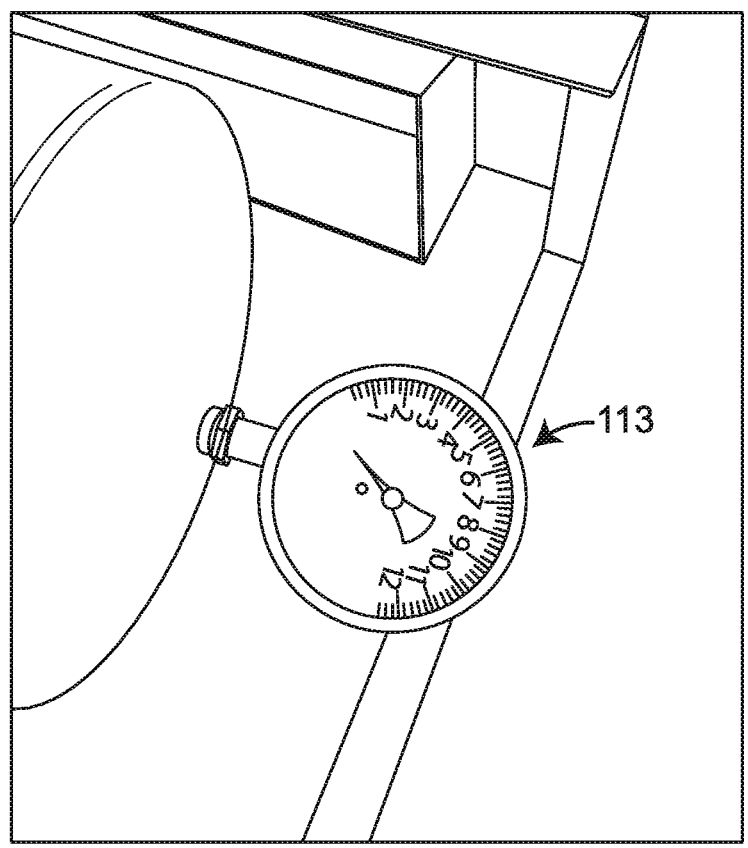
FIG. 4 depicts a pressure gauge for the pneumatic blower of FIG. 3.
Figure 5:
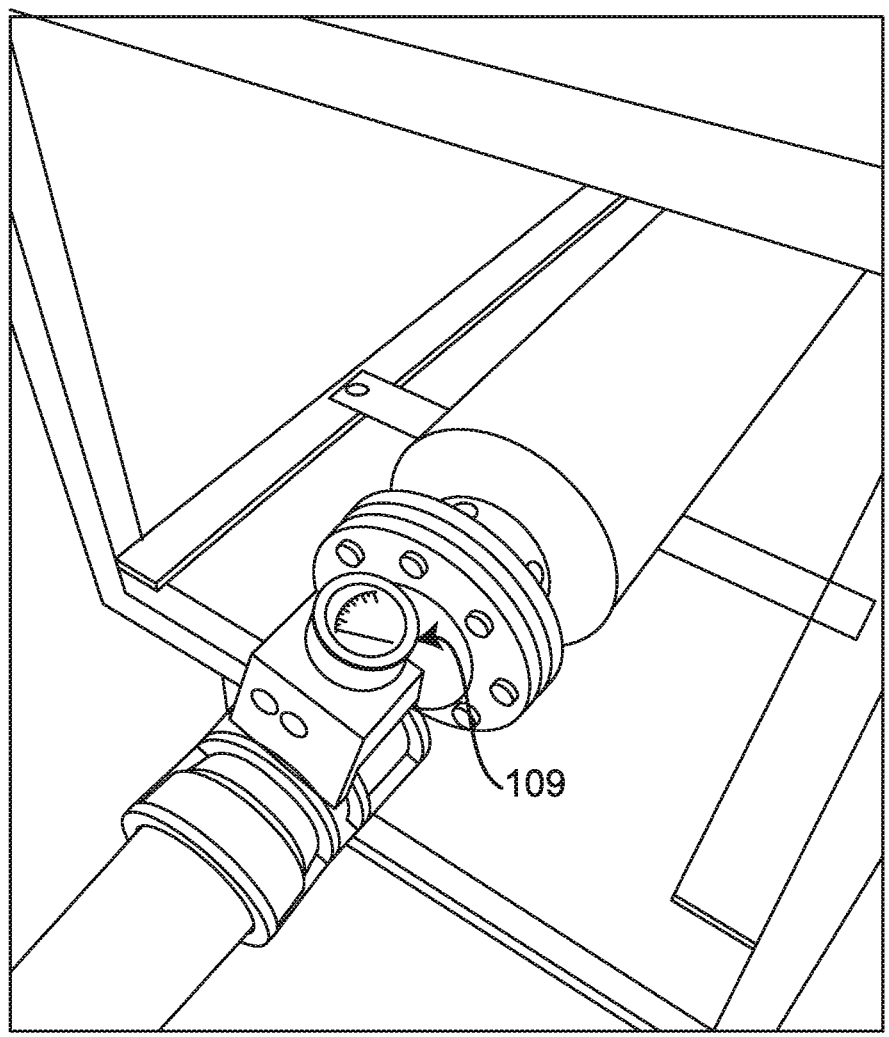
FIG. 5 depicts an SCFM flow meter and gate valves to control air flow pressure for the pneumatic blower of FIG. 3.
Figure 6:
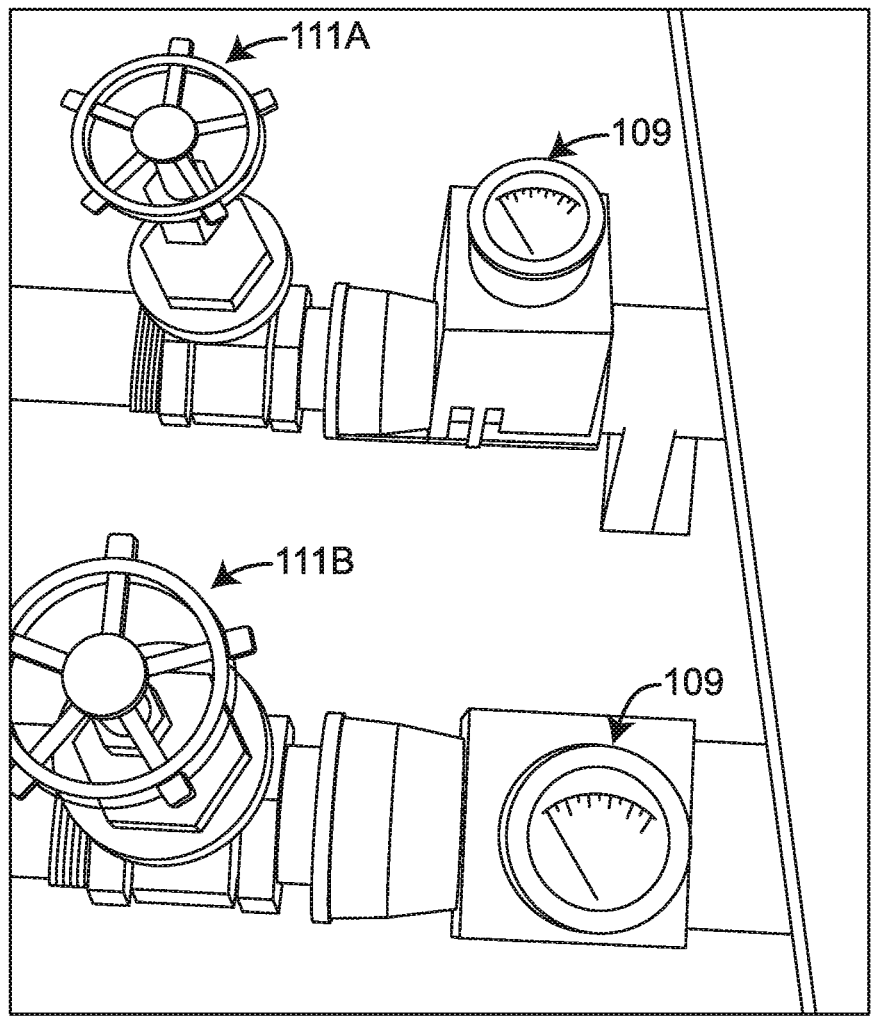
FIG. 6 depicts feeder discharge SCFM flow meters and gate valves to control air flow pressure for a test rig for testing rotary airlocks.
Figure 7:
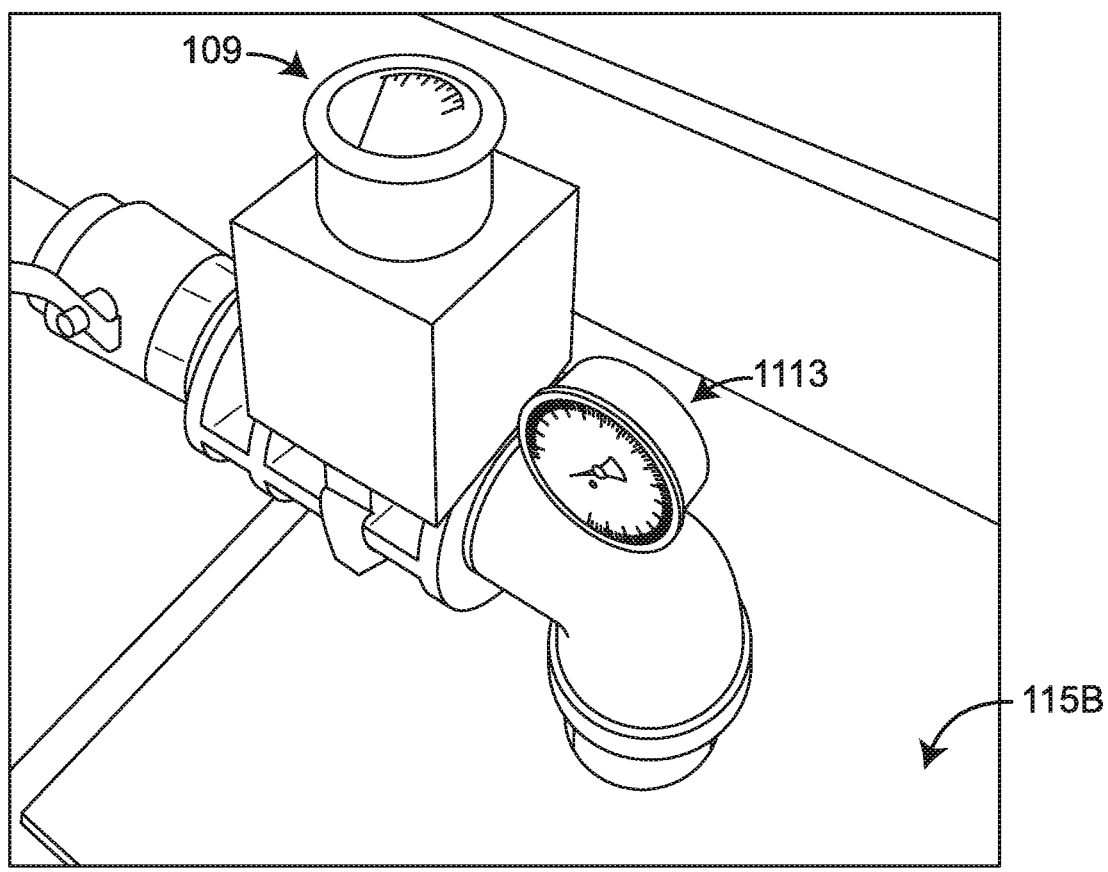
FIG. 7 depicts a feeder leakage SCFM flow meter, pressure gauge, and flow control valve for a test rig for testing rotary airlocks.
Figure 8:
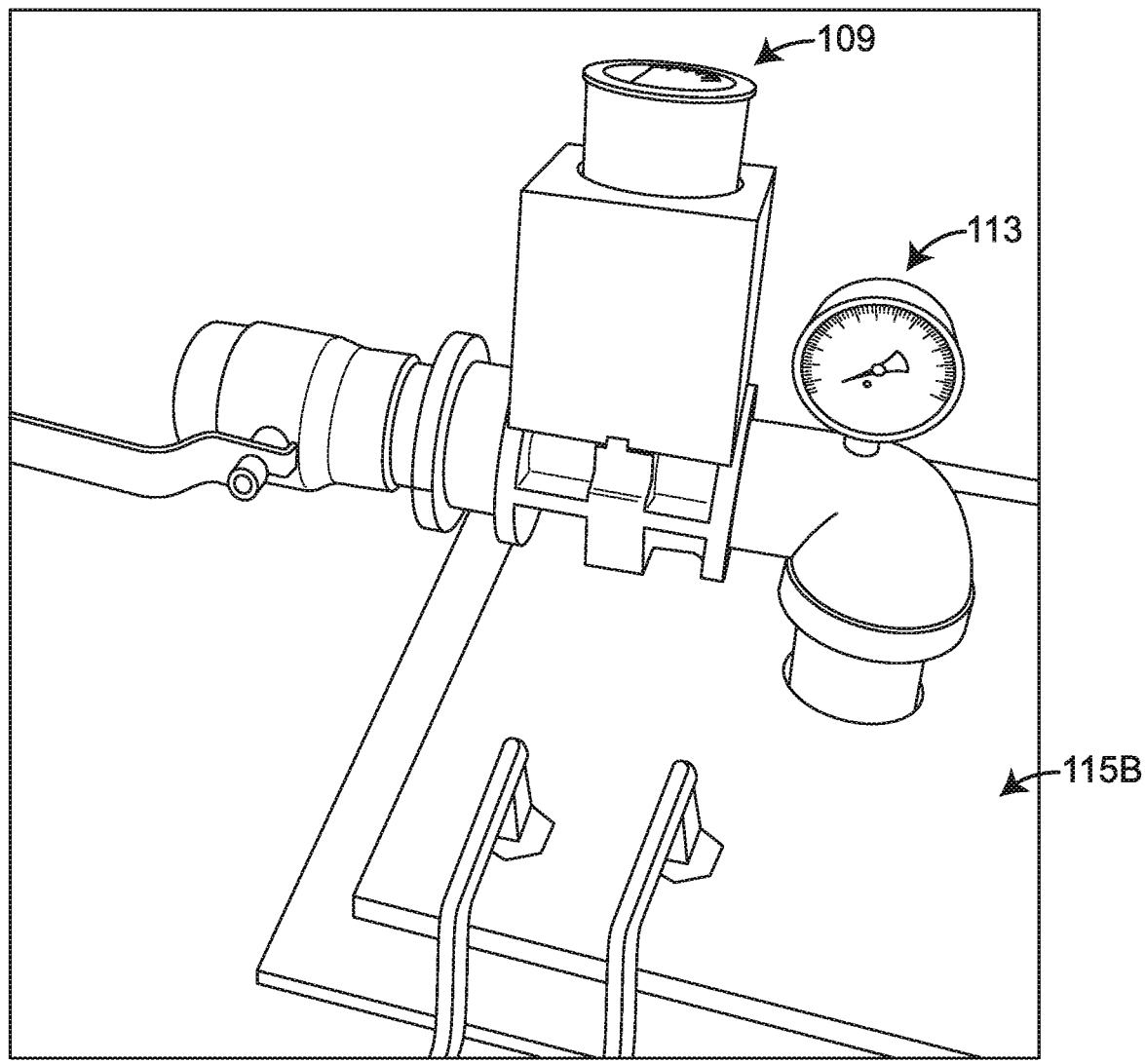
FIG. 8 depicts rotary feeders with top plates attached.

At a number of points in the system (100) there are provided flow meters (109) which are preferably standard cubic feet per minute (SCFM) flow meters although alternative flow meters may be used if desired. There is also generally provided a top plate (115A) and (115B) to seal the feeder inlet of the airlock (105A) or (105B) which is also provided with a flow meter (109) and optionally a pressure gauge (113) to determine leakage through the airlock (105A) or (105B). Valves (111A) and (111B) such as, but not limited to gate vales, may be provided for adjusting back pressure on the pneumatic blower conveyor line. The entire system may be controlled at a control panel (201) such as that shown in FIG. 2.

Figure 9:
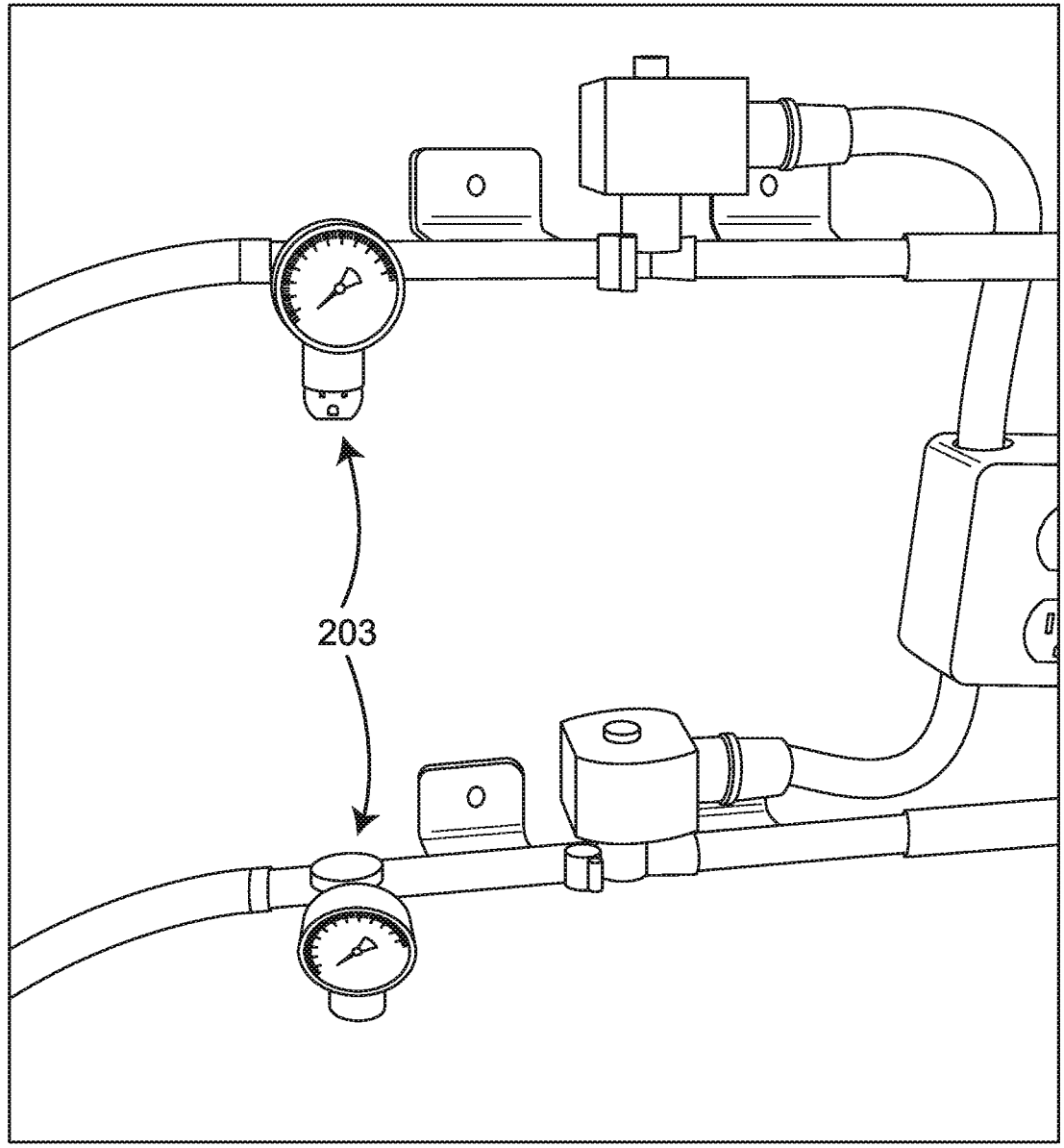
FIG. 9 depicts compressed air regulators for feeder shaft seal air.
Figure 10:
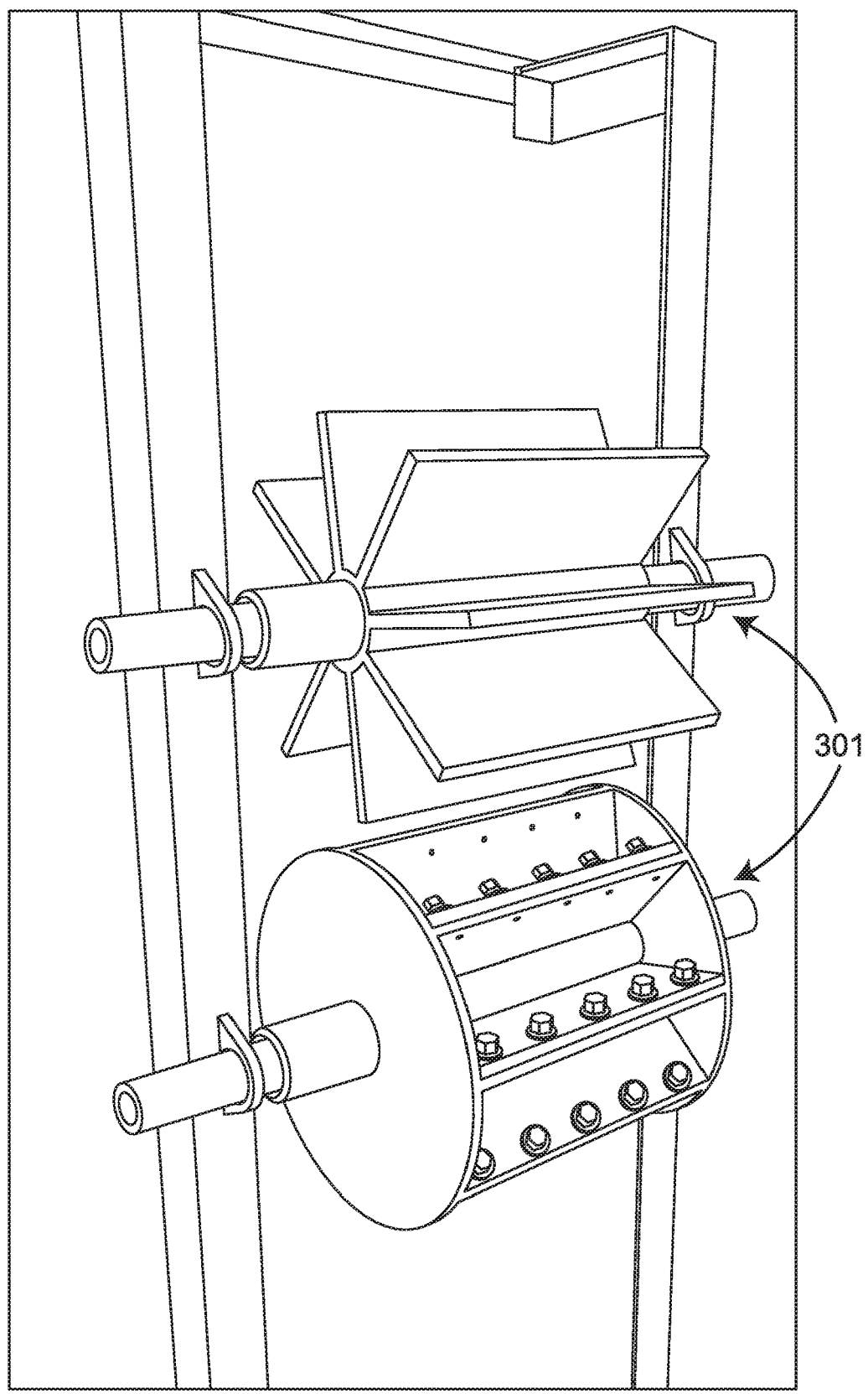
FIG. 10 depicts two feeder rotors on a display with an open end on the top and a closed end on the bottom.

FIGS. 2-10 provide for additional depictions of various elements of an embodiment of the system (100). FIG. 9 also provides that the system (100) may utilize regulators (203) for maintaining the shaft airflow and FIG. 10 provides for a rack where rotors (301) may be stored. These rotors (301) may comprise new rotors of particular types or may comprise rotors with a known level of damage. The rotors (301) may be used for comparison or calibration of the system and may be intended to be used in airlocks (105A) or (105B). Alternatively, they may be provided simply for display and educational purpose.

Pneumatic blower (101) air pressure may be measured at the blower outlet, airlock outlet, and/or airlock inlet but this is by no means required. When back pressure is increased by closing the valve (111A) or (111B) on the pneumatic blow line, outlet air leakage through the airlock (105A) or (105B) is typically increased and the blower (101) SCFM is decreased. The blower (101) SCFM output may be recorded, the airlock inlet and outlet air SCFM may also be recorded and compared against this value to quantify amount and percentage of leakage air from the specific airlock (105A) or (105B).

In an embodiment, the blower (101) may be bypassed and the in situ conveyor system's blower may be used to provide the air. This in situ blower (not shown) may be connected to line (103) in any manner known to one of ordinary skill in the art and this allows the in situ blower to be tied into the system allowing measurement of the performance of all of the key mechanical or operational components of a pneumatic conveying system at once.

Because of concerns with wear, some rotary airlocks are actually built with adjustable tips on the rotor assembly so they can be adjusted to keep the rotor and housing assembly clearances as close to original specs. The adjustable vanes can be set using a feeler gauge. While rotary airlocks may be regularly checked for wear using a feeler gauge to check the rotor to housing clearance. What cannot be checked with a feeler gauge is the scoring or wear of the housing and rotor tips. The system (100) of the FIGS. is designed to show actual leakage of air as opposed to trying to detect clearance and from that deducing air leakage. This differentiation is important as scoring or uneven wear cannot be adjusted out by moving the rotor tips and also may not be detected when examining clearance (as the clearance may vary at different points). Therefore, detection of clearance can actually result in a rotary airlock being cleared as working within tolerance (based on clearance) even while it is actually leaking more air than expected or desired. As the present system (100) is designed to measure actual airflow that passes through the airlock rotor and housing, it provides a much better indicator of the effect and true wear of a rotary airlock which is much more valuable.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "cylinder" are purely geometric constructs and no real-world component is a true "cylinder" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A rotary airlock test system comprising:
   a pneumatic blower which provides air flow into a source air path, said source air path splitting into a first air path and a second air path;
   a plurality of flow sensors;
   a first rotary airlock placed as if it feeds particulate into said first air path via an outlet;
   a second rotary airlock placed as if it feeds particulate into said second air path via an outlet; and
   a control system for obtaining outputs from the plurality of flow sensors;

wherein, at least one of said flow sensors from said plurality is placed in said source air path;

wherein, at least one of said flow sensors from said plurality is placed in said first air path after said first rotary airlock; and wherein, at least one of said flow sensors from said plurality is placed in said second air path after said second rotary airlock.

2. The system of claim 1 wherein said first rotary airlock is to be tested and said second rotary airlock is a control.

3. The system of claim 2 wherein said first air path includes at least a portion of a pneumatic conveyor that said first rotary airlock feeds.

4. The system of claim 3 wherein said second air path is designed to simulate conditions in said first air path.

5. The system of claim 2 wherein said control system compares output from said at least one of said flow sensors placed in said first air path to output from said at least one of said flow sensors from said plurality placed in said second air path.

6. The system of claim 2 further comprising:
at least one of said flow sensors from said plurality being placed to monitor flow into said inlet through said first rotary airlock; and
at least one of said flow sensors from said plurality being placed to monitor flow into said inlet through said second rotary airlock.

7. The system of claim 6 wherein said control system compares output from said at least one of said flow sensors placed to monitor flow into said inlet through said first rotary airlock to output from said at least one of said flow sensors placed to monitor flow into said inlet through said second rotary airlock.

8. The system of claim 2 further comprising:
a valve positioned in said second air flow path prior to said second rotary airlock for inhibiting air from said source air path from entering said second air flow path.

9. The system of claim 2 further comprising:
a valve positioned in said first air flow path after said first rotary airlock for creating back pressure in said first air flow path; and
a valve positioned in said second air flow path after said second rotary airlock for creating back pressure in said second air flow path.

10. The system of claim 2 wherein said flow sensors in said plurality of flow sensors comprise standard cubic feet per minute (SCFM) flow sensors.

11. The system of claim 1 further comprising:
at least one of said flow sensors from said plurality being placed to monitor flow into said inlet through said first rotary airlock; and
at least one of said flow sensors from said plurality being placed to monitor flow into said inlet through said second rotary airlock.

12. The system of claim 11 further comprising:
a valve positioned in said second air flow path prior to said second rotary airlock for inhibiting air from said source air path from entering said second air flow path.

13. The system of claim 12 further comprising:
a valve positioned in said first air flow path after said first rotary airlock for creating back pressure in said first air flow path; and
a valve positioned in said second air flow path after said second rotary airlock for creating back pressure in said second air flow path.

14. The system of claim 1 wherein said flow sensors in said plurality of flow sensors comprise standard cubic feet per minute (SCFM) flow sensors.

15. A method for testing a rotary airlock, the method comprising:
providing a pneumatic blower which provides air flow into a source air path, said source air path splitting into a first air path and a second air path and a plurality of flow sensors;
placing a first rotary airlock as if it feeds particulate into said first air path via an outlet;
placing a second rotary airlock as if it feeds particulate into said second air path via an outlet;
positioning at least one of said flow sensors from said plurality is placed in said source air path;
positioning at least one of said flow sensors from said plurality in said first air path after said first rotary airlock; and
positioning at least one of said flow sensors from said plurality in said second air path after said second rotary airlock.

16. The method of claim 15 wherein said first rotary airlock is to be tested and said second rotary airlock is a control.

17. The method of claim 16 wherein said first air path includes at least a portion of a pneumatic conveyor that said first rotary airlock feeds.

18. The method of claim 16 further comprising:
comparing output from said at least one of said flow sensors placed in said first air path to output from said at least one of said flow sensors from said plurality placed in said second air path.

19. The method of claim 16 further comprising:
placing at least one of said flow sensors from said plurality to monitor flow into said inlet through said first rotary airlock; and
placing at least one of said flow sensors from said plurality to monitor flow into said inlet through said second rotary airlock.

20. The method of claim 19 further comprising:
comparing output from said at least one of said flow sensors placed to monitor flow into said inlet through said first rotary airlock to output from said at least one of said flow sensors placed to monitor flow into said inlet through said second rotary airlock.

* * * * *